Figures 1, 2, 3:
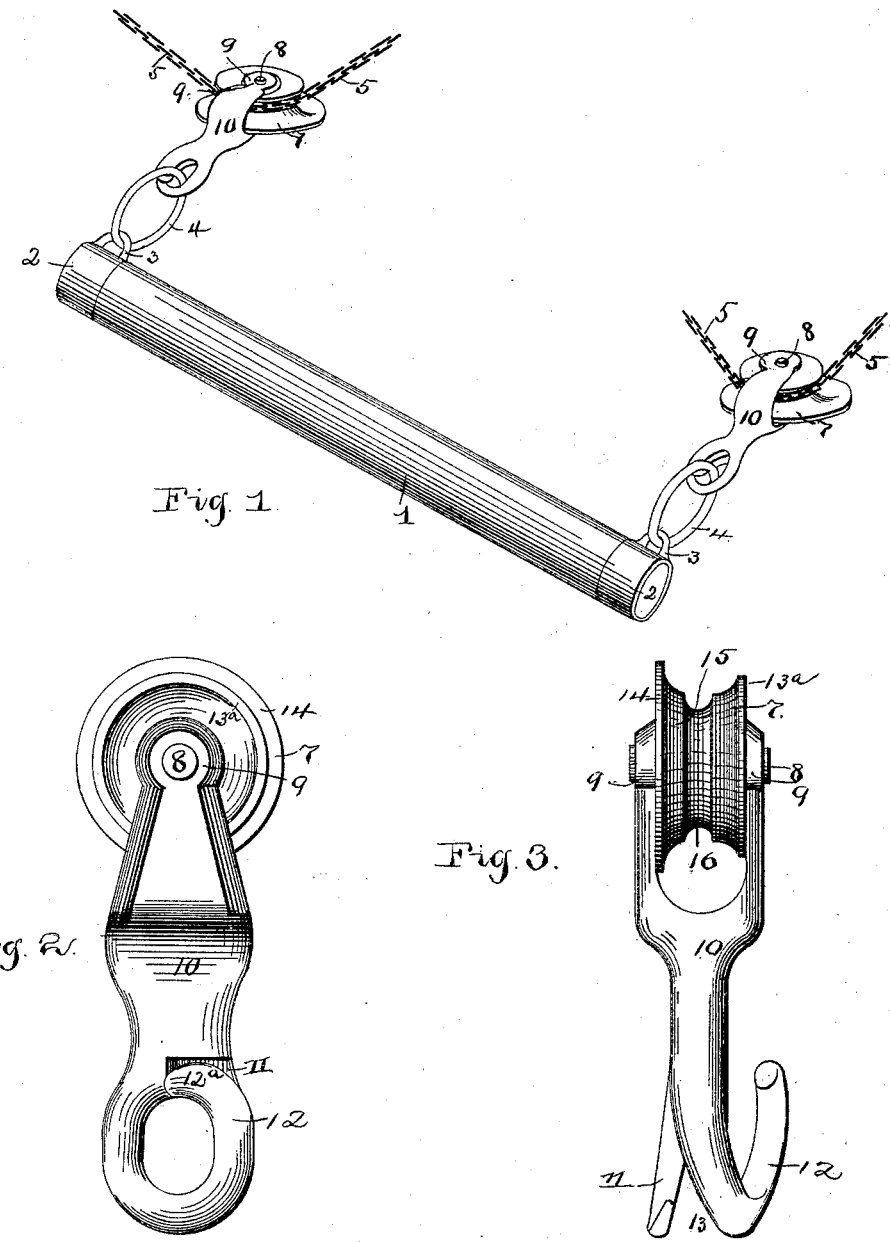

(No Model.)

G. A. HARRIS.
HARNESS ATTACHMENT.

No. 448,763. Patented Mar. 24, 1891.

Witnesses

Inventor
George A. Harris,
By his Attorneys,
C. A. Snow & Co.

UNITED STATES PATENT OFFICE.

GEORGE A. HARRIS, OF RACINE, WISCONSIN.

HARNESS ATTACHMENT.

SPECIFICATION forming part of Letters Patent No. 448,763, dated March 24, 1891.

Application filed September 26, 1890. Serial No. 366,282. (No model.)

*To all whom it may concern:*

Be it known that I, GEORGE A. HARRIS, a citizen of the United States, residing at Racine, in the county of Racine and State of Wisconsin, have invented a new and useful Harness Attachment, of which the following is a specification.

My invention relates to attachments for double harness, being that part of a harness which attaches the horses to the neck-yoke, where there is great strain and it is absolutely necessary to provide an attachment that will be strong and durable; and it consists in certain features of novelty, to be hereinafter described, and then pointed out in the claim.

In the accompanying drawings, Figure 1 is a perspective view showing my improved harness attachment. Fig. 2 is a side view of the pulley and pulley-block. Fig. 3 is an edge view of the pulley and pulley-block.

1 is a neck-yoke provided with the customary ferrules or collars 2 at each end, having eyes 3. Through the eyes 3 rings 4 pass, and with these rings the attachment is connected. The attachment proper consists of a chain 5, the end links of which are longer than the middle links and are attached to the hame-rings, one chain being provided for each horse. The chains pass under pulleys 7, each pulley being mounted on a pin or axle 8, the ends of which are fixed in the outer ends of the forks 9 of the bifurcated pulley-block 10. Said pulley-block is provided at its lower end with a pair of hooks 11 and 12, which are spread apart, providing a space 13 between them. The hook 11 is C-shaped, and the hook 12 is curved downwardly and upwardly in a spiral manner, its upwardly-curved portion 12ª being directly opposite and substantially parallel with the hook 11. This hooked pulley-block has the advantage over the ordinary hooks in that it is perfectly safe, there being no springs or pivoted parts to break or get out of repair. In the winter-time the ordinary snap-hook becomes frozen up, and when it is desired to detach it it is necessary to use a hammer to get the team apart.

The pulley shown is of superior construction, having at one end the annular flange 13 and at the other end the annular flange 14, of greater diameter than said flange 13. Said flanges provide the usual groove 15, at the bottom of which and midway between the flanges is formed in the pulley a circumferential groove 16.

The pulley or sheave 7 is a necessity where a chain is used, as it acts the same as a roller-snap on a strap, and it causes no friction or wear on the chain. The large flange 14 of each pulley is presented toward the horses, so that when the wheels of a vehicle strike a stone, thus causing the pole of the vehicle to jump or move upwardly and throw the chain out of the pulley, the flange will catch the chain. The groove 15 is wide enough to receive the links of the chain that travel over the pulley transversely thereto, and the groove 16 at the bottom of groove 15 guides the alternate links that are presented to the pulley in a plane parallel therewith.

The numerous advantages of chains instead of leather straps will be apparent to every one.

What I claim is—

The herein-described harness attachment, comprising the pulley having a curved groove 15 and a supplemental groove 16 in the bottom of the other groove and provided at each side with an annular flange, one of the flanges being enlarged and forming a shield, and the pulley-block provided with a pair of integral diverging hooks forming a part of the block, one of the hooks being C-shaped and terminating at the end of the block and the other hook being spirally formed and provided with a portion extending inward and arranged directly opposite the other hook and forming a loop, substantially as specified.

In testimony that I claim the foregoing as my own I have hereto affixed my signature in presence of two witnesses.

GEORGE A. HARRIS.

Witnesses:
J. W. TEALL,
J. B. MANDERSON.